US009447869B2

(12) United States Patent
Tetsuka et al.

(10) Patent No.: US 9,447,869 B2
(45) Date of Patent: Sep. 20, 2016

(54) ELECTRIC BICYCLE COMPONENT

(71) Applicant: Shimano Inc., Sakai, Osaka (JP)

(72) Inventors: Toshio Tetsuka, Osaka (JP); Shintaro Mori, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/632,046

(22) Filed: Feb. 26, 2015

(65) Prior Publication Data

US 2015/0337951 A1   Nov. 26, 2015

(30) Foreign Application Priority Data

May 23, 2014   (JP) .................................. 2014-107155

(51) Int. Cl.

| F16H 59/48 | (2006.01) |
|---|---|
| F16H 61/02 | (2006.01) |
| B62M 25/08 | (2006.01) |
| F16H 59/44 | (2006.01) |

(52) U.S. Cl.
CPC .......... *F16H 61/0213* (2013.01); *B62M 25/08* (2013.01); *F16H 59/44* (2013.01); *F16H 59/48* (2013.01); *F16H 2061/0227* (2013.01); *F16H 2061/0234* (2013.01)

(58) Field of Classification Search
None
See application file for complete search history.

(56) References Cited

U.S. PATENT DOCUMENTS

| 5,027,303 | A | * | 6/1991 | Witte | A61B 5/222 482/8 |
|---|---|---|---|---|---|
| 5,261,858 | A | * | 11/1993 | Browning | B62M 9/122 474/69 |
| 5,599,244 | A | * | 2/1997 | Ethington | B62M 9/122 280/261 |
| 5,992,553 | A | * | 11/1999 | Morrison | B62M 6/45 180/206.2 |
| 6,015,021 | A | * | 1/2000 | Tanaka | B62M 6/45 180/206.2 |
| 6,047,230 | A | * | 4/2000 | Spencer | B62M 9/123 474/70 |
| 6,837,505 | B2 | * | 1/2005 | Fujii | B62M 25/08 280/260 |

(Continued)

*Primary Examiner* — Dirk Wright
(74) *Attorney, Agent, or Firm* — Global IP Counselors

(57) ABSTRACT

An electric bicycle component is basically provided that is capable of realizing finer control of the transmission device according to the riding environment. The electric bicycle component includes a control unit that is mounted to a bicycle. The control unit includes a controller and an acceleration detection unit. The acceleration detection unit includes programmed to detect an acceleration of the bicycle. The controller programmed to select one of a first to a third shifting conditions based on the acceleration detected by the acceleration detection unit, and controls an actuator of the transmission device based on the selected shifting condition.

24 Claims, 4 Drawing Sheets

U.S. PATENT DOCUMENTS

| | | | | |
|---|---|---|---|---|
| 6,957,129 B2* | 10/2005 | Hatanaka | ............ | B60L 11/1803 280/210 |
| 7,062,980 B2* | 6/2006 | Takamoto | .............. | B62M 25/08 73/862.31 |
| 7,290,779 B2* | 11/2007 | Takamoto | .............. | B62K 23/04 280/260 |
| 7,900,946 B2* | 3/2011 | Hara | ...................... | B62M 9/122 280/238 |
| 8,249,782 B2* | 8/2012 | Miglioranza | .......... | B62M 25/08 475/176 |
| 8,645,032 B2* | 2/2014 | Pasqua | .................. | B62M 25/08 280/260 |
| 8,781,663 B2* | 7/2014 | Watarai | ................... | B62M 6/45 701/22 |
| 8,831,810 B2* | 9/2014 | Shoge | ...................... | B62M 6/45 701/22 |
| 8,874,338 B2* | 10/2014 | Miglioranza | .......... | B62M 9/122 180/218 |
| 8,958,935 B2* | 2/2015 | Shoge | ...................... | B62M 6/45 701/22 |
| 9,008,931 B2* | 4/2015 | Cheng | .................... | B62M 25/08 474/69 |
| 9,090,178 B2* | 7/2015 | Tsuchizawa | ............ | B60L 15/20 |
| 9,114,850 B2* | 8/2015 | Tanaka | ..................... | B62M 6/45 |
| 9,150,278 B2* | 10/2015 | Lukatela | .................. | B62M 3/16 |
| 2004/0035233 A1* | 2/2004 | Takeda | .................. | B62M 25/08 74/336 R |
| 2007/0170688 A1* | 7/2007 | Watson | .................... | B62J 99/00 280/260 |
| 2016/0052583 A1* | 2/2016 | Sasaki | ..................... | B62J 99/00 74/594.4 |
| 2016/0052584 A1* | 2/2016 | Sasaki | ..................... | B62J 99/00 74/594.4 |

* cited by examiner

ELECTRIC BICYCLE COMPONENT

CROSS-REFERENCE TO RELATED APPLICATIONS

This application claims priority to Japanese Patent Application No. 2014-107155, filed on May 23, 2014. The entire disclosure of Japanese Patent Application No. 2014-107155 is hereby incorporated herein by reference.

BACKGROUND

1. Field of the Invention

This invention generally relates to an electric bicycle component for a bicycle that controls a transmission device.

2. Background Information

An electric bicycle component is known for controlling a transmission device of a bicycle according to various conditions. The transmission device changes a gear ratio of a bicycle. The appropriate gear ratio differs depending on the riding environment of the bicycle. For example, when a bicycle climbs a slope, the load on the rider becomes smaller when the gear ratio is downshifted, as compared to when riding on a flat road. Accordingly, for example, an electric bicycle component is disclosed in Japanese Patent No. 3,284,060 for controlling the transmission device based on the results of comparing the bicycle speed and the manual force applied to the pedal with values that have been set in advance.

SUMMARY

The above described electric bicycle component controls a transmission device using values that have been set in advance. On the other hand, other values relating riding besides the bicycle speed and the manual force applied to the pedal are not taken into consideration. Consequently, there is room for improvement regarding the control of the gear ratio.

One object of the present invention is to provide an electric component for a bicycle that is capable of realizing finer control of the transmission device according to the riding environment.

In view of the state of the known technology and in accordance with a first aspect of the present disclosure, an electric bicycle component is provided that is mounted to a bicycle. The electric bicycle component basically comprises a controller and an acceleration detection unit. The controller is programmed to control a transmission device of the bicycle. The acceleration detection unit is programmed to detect an acceleration of the bicycle. The controller selects from a plurality of shifting conditions based on at least the acceleration detected by the acceleration detection unit and controls a transmission device based on the shifting condition that has been selected.

In accordance with a second aspect of the present invention, the electric bicycle component according to the first aspect further comprises a manual force detection unit programmed to detect a manual force that is applied to a pedal of the bicycle. The controller being programmed to control the transmission device based on the shifting condition that has been selected and the manual force that has been detected by the manual force detection unit.

In accordance with a third aspect of the present invention, the electric bicycle component according to the first aspect is configured so that the controller is programmed to change the shifting condition that has been selected to a different shifting condition based on the acceleration that has been detected by the acceleration detection unit.

In accordance with a fourth aspect of the present invention, the electric bicycle component according to the first aspect is configured so that the controller is programmed to select a first shifting condition of the shifting conditions upon making an assessment that the bicycle is traveling at a substantially stable speed based on the acceleration that has been detected by the acceleration detection unit.

In accordance with a fifth aspect of the present invention, the electric bicycle component according to the first aspect is configured so that the controller is programmed to select a second shifting condition of the shifting conditions upon making an assessment that the bicycle is substantially accelerating based on the acceleration that has been detected by the acceleration detection unit.

In accordance with a sixth aspect of the present invention, the electric bicycle component according to the first aspect is configured so that the controller is programmed to select a third shifting condition of the shifting conditions upon making an assessment that the bicycle is substantially decelerating based on the acceleration that has been detected by the acceleration detection unit.

In accordance with a seventh aspect of the present invention, the electric bicycle component according to the second aspect is configured so that each of the shifting conditions comprises at least one assessment value; and the controller is programmed to control the transmission device based on the manual force that has been detected by the manual force detection unit and the at least one assessment value for the shifting condition that has been selected.

In accordance with an eighth aspect of the present invention, the electric bicycle component according to the seventh aspect is configured so that the controller is programmed to control the transmission device to upshift when the manual force that has been detected by the manual force detection unit is the same as a first assessment value of the at least one assessment value for the shifting condition that has been selected, or is less than the first assessment value.

In accordance with a ninth aspect of the present invention, the electric bicycle component according to the seventh aspect is configured so that the controller is programmed to control the transmission device to downshift when the manual force that has been detected by the manual force detection unit is the same as a second assessment value of the at least one assessment value for the shifting condition that has been selected, or is greater than the second assessment value.

In accordance with a tenth aspect of the present invention, the electric bicycle component according to the seventh aspect is configured so that the at least one assessment value for each of the shifting conditions comprises at least first and second assessment values, the first assessment value being less than the second assessment value.

In accordance with an eleventh aspect of the present invention, the electric bicycle component according to the seventh aspect is configured so that the controller is configured to receive a shift command from a manual shift command input unit. The controller is programmed to control the transmission device to upshift or to downshift, based on the shift command received from the manual shift command input unit, and to change the at least one of the assessment value for the shifting condition that has been selected to a value different from that prior to receiving the shift command.

In accordance with a twelfth aspect of the present invention, the electric bicycle component according to the eleventh aspect is configured so that the controller is programmed to control the transmission device to upshift when the manual force that has been detected by the manual force detection unit is the same as a first assessment value of the at least one of the assessment value for the shifting condition that has been selected, or is less than the first assessment value. The controller is programmed to control the transmission device to upshift when a first shift command to upshift the transmission device has been received. The controller is programmed to change the first assessment value to a value that is greater than that prior to receiving the first shift command.

In accordance with a thirteenth aspect of the present invention, the electric bicycle component according to the eleventh aspect is configured so that the at least one assessment value for each of the shifting conditions comprises at least a second assessment value. The controller is programmed to control the transmission device to downshift when the manual force that has been detected by the manual force detection unit is the same as a second assessment value of the at least one of the assessment value for the shifting condition that has been selected, or is greater than the second assessment value. The controller is programmed to control the transmission device to downshift when a second shift command to downshift the transmission device has been received. The controller is programmed to change the second assessment value to a value that is less than that prior to receiving the second shift command.

In accordance with a fourteenth aspect of the present invention, the electric bicycle component according to the eleventh aspect is configured so that the at least one of the assessment value for each of the shifting conditions comprises at least first and second assessment values. The first assessment value has a default value that is less than a default value of the second assessment value for each of the shifting conditions.

In accordance with a fifteenth aspect of the present invention, the electric bicycle component according to the second aspect further comprises a speed detection unit programmed to detect a speed of the bicycle. The controller is programmed to control the transmission device based on the speed of the bicycle when the manual force detection unit has not detected the manual force for a prescribed period of time.

In accordance with a sixteenth aspect of the present invention, the electric bicycle component according to the fifteenth aspect is configured so that the speed detection unit detects the speed of the bicycle based on a signal that is output from a dynamo of the bicycle.

In accordance with a seventeenth aspect of the present invention, the electric bicycle component according to the first aspect is configured so that the acceleration detection unit detects the acceleration of the bicycle based on a signal that is output from a dynamo of the bicycle.

In accordance with an eighteenth aspect of the present invention, the electric bicycle component according to the seventeenth aspect is configured so that the acceleration detection unit detects an average value of the acceleration of the bicycle over a prescribed period of time, based on the signal that is output from the dynamo of the bicycle.

In accordance with a nineteenth aspect of the present invention, the electric bicycle component according to the second aspect is configured so that the manual force detection unit detects the manual force that is applied to the pedal of the bicycle based on a signal that is output from a strain sensor that outputs a signal that changes according to strain of a crank of the bicycle.

In accordance with a twentieth aspect of the present invention, the electric bicycle component according to the first aspect further comprises a storage unit having the shifting conditions stored therein.

In accordance with a twenty-first aspect of the present invention, an electric bicycle component is provided that basically comprises a controller and a manual force detection unit. The controller is programmed to control a transmission device of the bicycle. The manual force detection unit is programmed to detect a manual force that is applied to a pedal of the bicycle. The controller is configured to receive a shift command from a manual shift command input unit, the controller being programmed to control the transmission device based on the manual force that has been detected by the manual force detection unit and at least one assessment value for controlling the transmission device based on the manual force. The controller is programmed to output a command to upshift or downshift the transmission device in response to receiving the shift command from the manual shift command input unit. The controller is programmed to change the at least one of the assessment value to a value that is different from that prior to receiving the shift command.

In accordance with a twenty-second aspect of the present invention, the electric bicycle component according to the twenty-first is configured so that the controller is programmed to control the transmission device to upshift when receiving a first shift command from the manual shift command input unit for upshifting the transmission device. The controller is programmed to change a first assessment value of the at least one of assessment value to a value that is greater than that prior to receiving the first shift command.

In accordance with a twenty-third aspect of the present invention, the electric bicycle component according to the twenty-first aspect is configured so that the controller is programmed to control the transmission device to downshift when receiving a second shift command from the manual shift command input unit for downshifting the transmission device. The controller is programmed to change a second assessment value of the at least one of assessment value to a value that is less than that prior to receiving the second shift command.

In accordance with a twenty-fourth aspect of the present invention, the electric bicycle component according to the twenty-first aspect is configured so that the at least one of the assessment value comprises at least first and second assessment values. The first assessment value has a default value that is less than a default value of the second assessment value for each of the shifting conditions.

Also other objects, features, aspects and advantages of the disclosed electric bicycle component will become apparent to those skilled in the art from the following detailed description, which, taken in conjunction with the annexed drawings, discloses one embodiment of the electric bicycle component.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
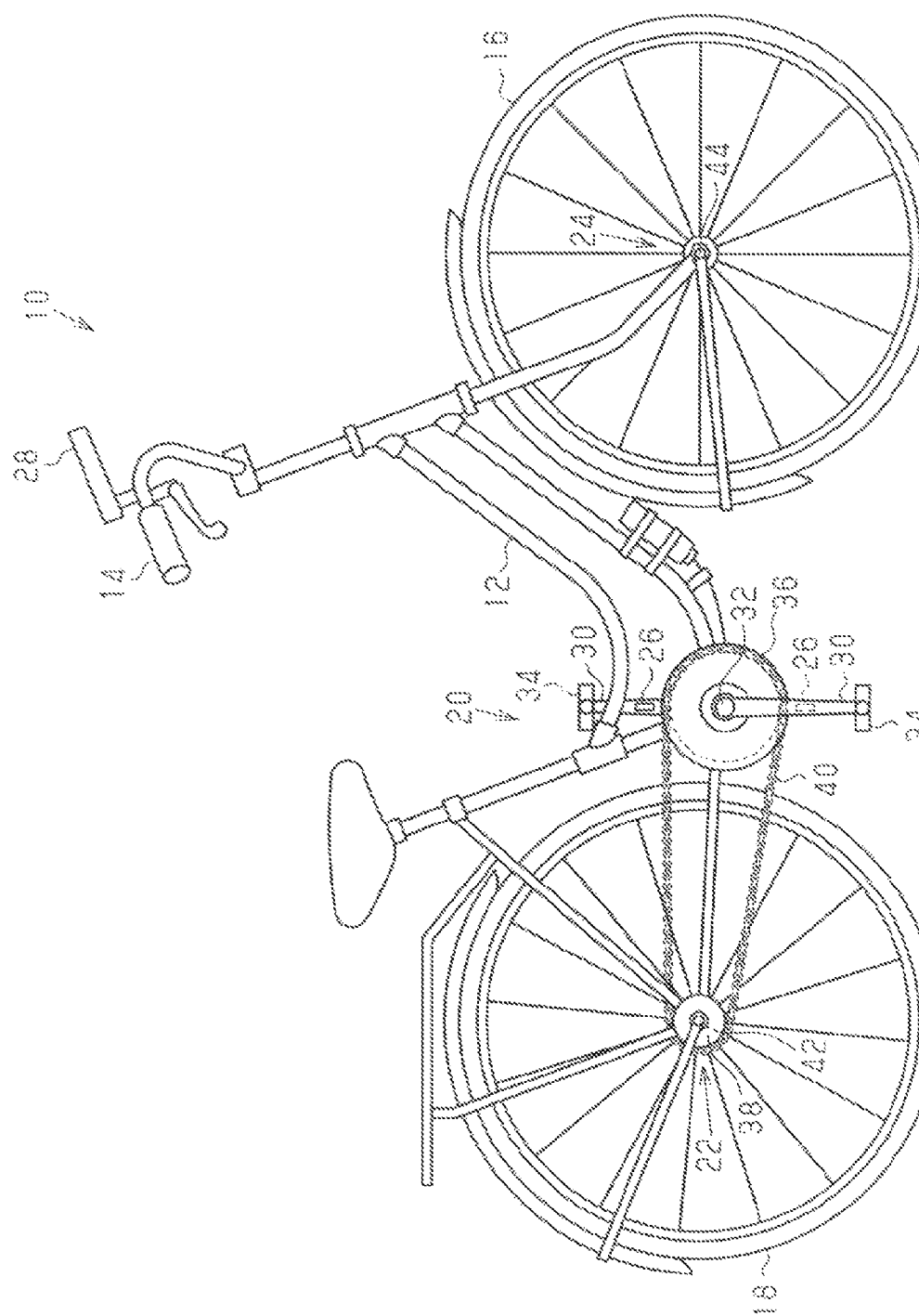
FIG. 1 is a side elevational view of a bicycle that is equipped with an electric bicycle component having a control unit in accordance with one illustrated embodiment.

Referring initially to FIG. 1, a bicycle 10 is illustrated that is equipped with an electric bicycle component 12 in accordance with a first embodiment.

The bicycle 10 comprises a frame 12, a handle 14, a front wheel 16, a rear wheel 18, a drive mechanism 20, a transmission device 22, a dynamo 24, two strain sensors 26, and a manual shift command input unit 28.

The drive mechanism 20 comprises left and right cranks 30, a crankshaft 32, left and right pedals 34, a drive sprocket 36, a driven sprocket 38, and a chain 40. The left and right cranks 30 are attached to the frame 12 in order to be able to rotate about the frame 12 via one crankshaft 32. The pedals 34 are attached to the crank 30 in order to be able to rotate about the crank 30.

The drive sprocket 36 is attached to the outer periphery of the crankshaft 32. The driven sprocket 38 is attached to the outer periphery of the axle 42 of the rear wheel 18. The chain 40 is wound to the drive sprocket 36 and the driven sprocket 38. When the crank 30 is rotated by the manual force applied to the pedals 34, the axle 42 of the rear wheel 18 is rotated by the drive sprocket 36, the chain 40, and the driven sprocket 38.

The dynamo 24 is integrally configured with an axle 44 of the front wheel 16. The dynamo 24 outputs a signal according to the number of revolutions of the front wheel 16. The two strain sensors 26 are attached to each of the left and right cranks 30. The two strain sensors 26 output signals according to the strain of the cranks 30 to which they are attached. The strain of the left and right cranks 30 is correlated with the manual force that is applied to the pedals 34. Consequently, the output of the right strain sensor 26 correlates with the manual force that is applied to the right pedal 34. The output of the left strain sensor 26 correlates with the manual force that is applied to the left pedal 34.

The manual shift command input unit 28 is attached to the handle 14. The manual shift command input unit 28 outputs a shift command signal according to an operation performed by the rider. The shift command signal includes a first shift command signal indicating an upshift and a second shift command signal indicating a downshift.

The transmission device 22 is integrally formed with the axle 42 of the rear wheel 18. The transmission device 22 is an internal type that is integrated with a hub. The transmission device 22 includes shift positions from the first gear to the eighth gear. The transmission device 22 comprises an actuator 46 (refer to FIG. 2) and a planetary gear mechanism (diagram omitted) that is operated by the actuator 46. The actuator 46 is, for example, a motor. The actuator 46 changes the shift position, that is, the gear ratio of the bicycle 10, by changing the connection mode of the gears that configure the planetary gear mechanism.

Figure 2:
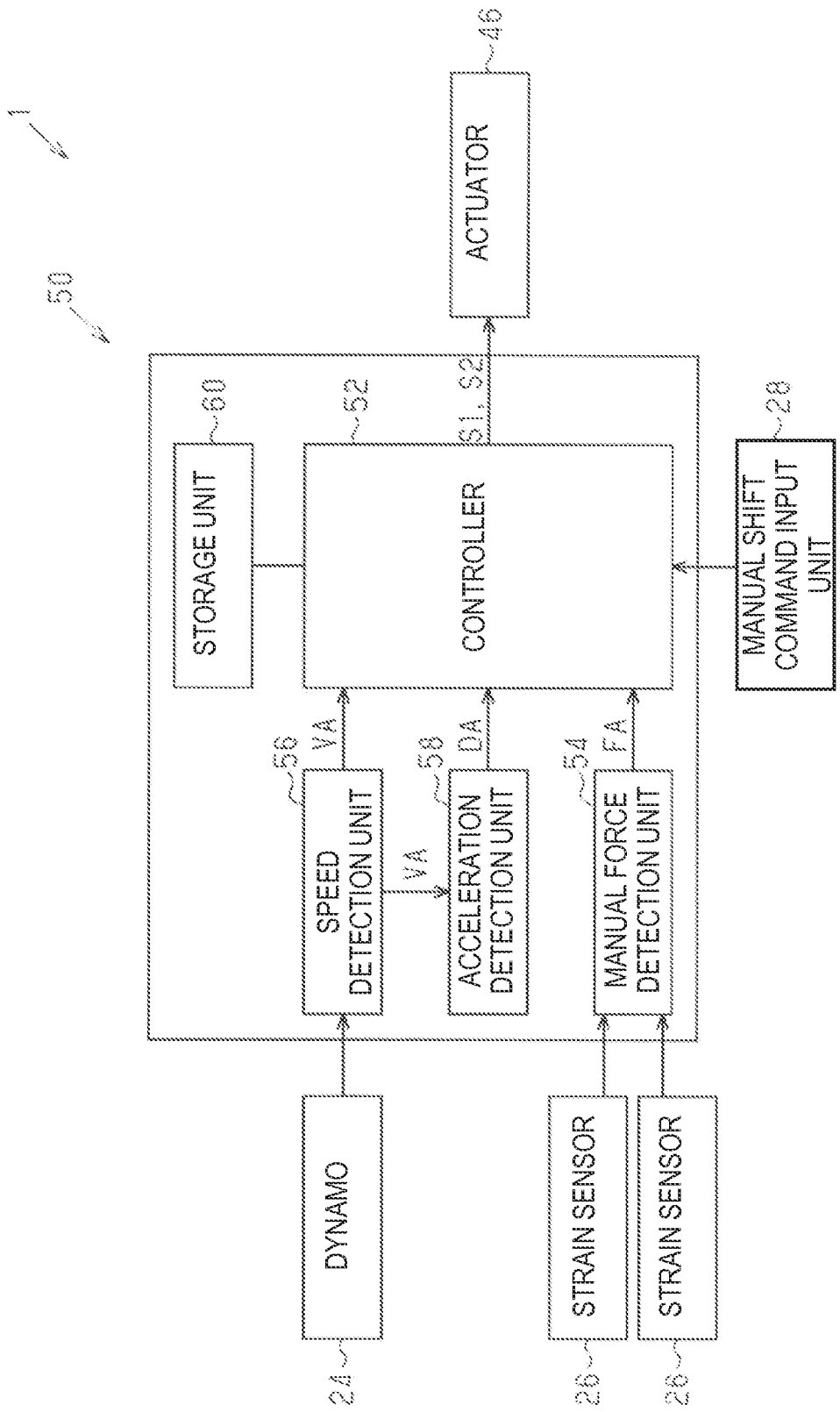
FIG. 2 is a block diagram showing an electrical configuration of electric bicycle component having the control unit of the illustrated embodiment.

The configuration of a control unit 50, which is the electric component for a bicycle 10 that is mounted to the bicycle, will be explained with reference to FIG. 2. The control unit 50 comprises a controller 52, a manual force detection unit 54, a speed detection unit 56, an acceleration detection unit 58 and a storage unit 60. The control unit 50 is connected to the dynamo 24, the two strain sensors 26, the manual shift command input unit 28, and the actuator 46 by communication lines.

The manual force detection unit 54 detects the manual force FA that is applied to the right pedal 34 (refer to FIG. 1) and the manual force FA that is applied to the left pedal 34 (refer to FIG. 1) of the bicycle 10, based on signals that are output from the left and right strain sensors 26. The output of the strain sensor 26 is periodically varied according to the rotation of the crank 30 (refer to FIG. 1). Accordingly, the manual force detection unit 54 detects, for example, the peak value of the output of the strain sensor 26 as the manual force FA.

The speed detection unit 56 detects the speed VA of the bicycle 10 based on a signal that is output from the dynamo 24 of the bicycle 10. The output of the dynamo 24 is periodically varied according to the rotation of the front wheel 16 (refer to FIG. 1). Accordingly, the speed detection unit 56 detects the number of revolutions of the front wheel 16 (refer to FIG. 1) over a prescribed period of time from the output of the dynamo 24 as the speed VA.

The acceleration detection unit 58 calculates the change in speed over a prescribed period of time, based on the change in the speed VA that is detected by the speed detection unit 56, and detects the moving average value of this change in the speed at a plurality of points as the acceleration DA.

The storage unit 60 stores a plurality of shifting conditions selected by the controller 52, as well as the stopped condition. The plurality of shifting conditions comprises a first shifting condition, a second shifting condition, and a third shifting condition. Each of the plurality of shifting conditions comprises one or two assessment values FX. The first shifting condition comprises a first assessment value FXA1 and a second assessment value FXA2. The default value of the first assessment value FXA1 is less than the default value of the second assessment value FXA2. The second shifting condition includes the first assessment value FXB. The third shifting condition includes the second assessment value FXC. The default value of the first assessment value FXA1, the default value of the second assessment value FXA2, the default value of the first assessment value FXB, and the default value of the second assessment value FXC are different from each other. The storage unit 60 stores the default values of each assessment value FX.

The controller 52 executes the shifting operation for controlling the transmission device 22 of the bicycle 10 based on signals that are input from the manual force detection unit 54, the speed detection unit 56, the acceleration detection unit 58, and the storage unit 60.

Figure 3:
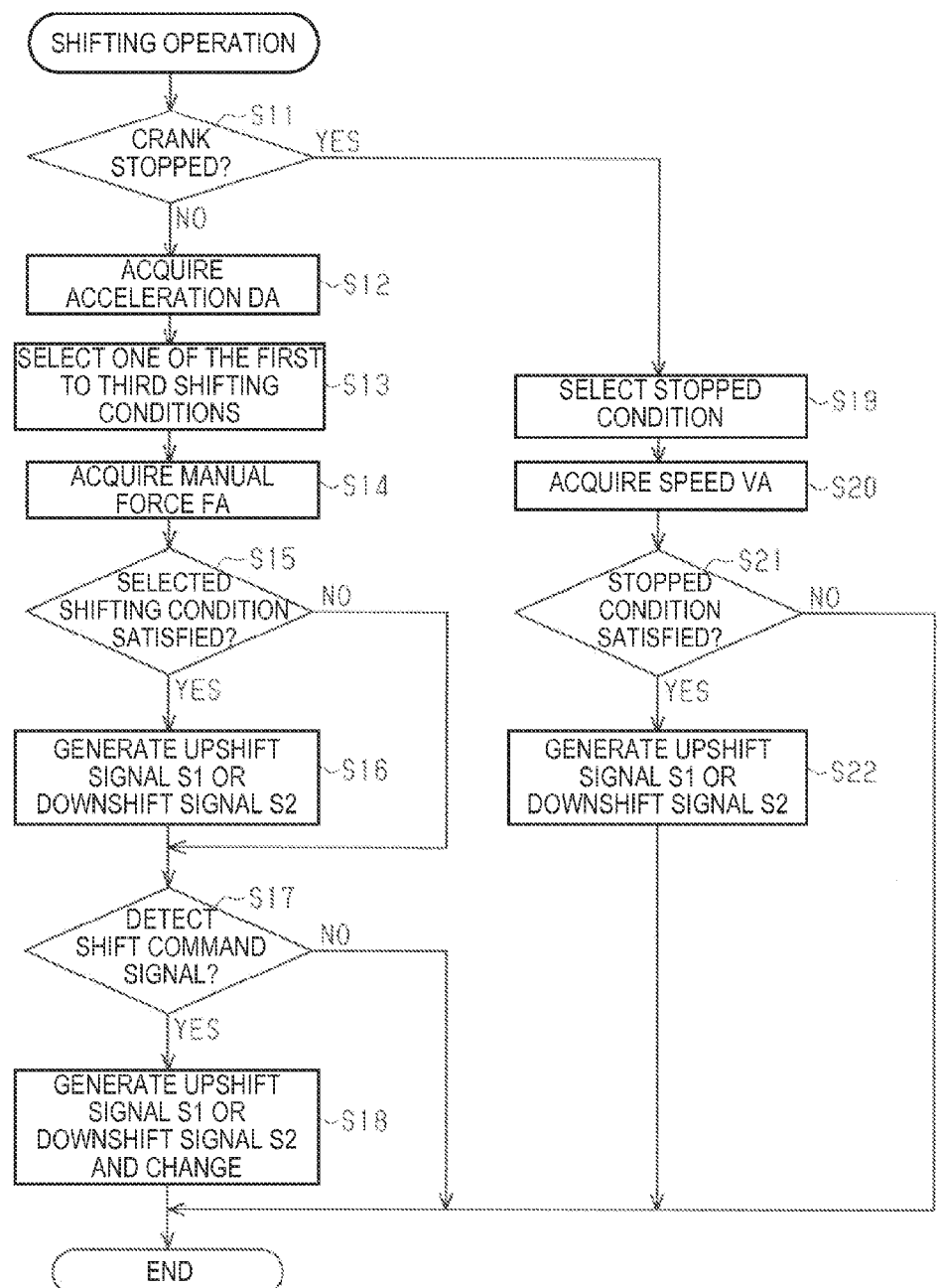
FIG. 3 is a flowchart showing the procedure of a shifting operation of the illustrated embodiment.

The procedure for the shifting operation that is executed by the controller 52 will be described with reference to FIG. 3. The controller 52 assesses whether or not the crank 30 is stopped in step S11. Specifically, the controller 52 assesses that the crank 30 is stopped when the manual force detection unit 54 has not substantially detected the manual force FA from at least one of the left and right strain sensors 26 for a prescribed period of time, for example, for two seconds.

When an assessment has been made that the crank 30 is not stopped in step S11, the controller 52 acquires the acceleration DA from the acceleration detection unit 58 in step S12. Next, the controller 52 selects one of the first to the third shifting conditions stored in the storage unit 60 and changes the shifting condition based on the acceleration DA in step S13. Specifically, the controller 52 selects the first shifting condition when an assessment has been made that the acceleration DA is less than a first prescribed value DX1 and is greater than a second prescribed value DX2, that is, that the bicycle 10 is traveling at a substantially stable speed. For example, "1" may be used as the first prescribed value DX1. For example, "−1" may be used as the second prescribed value DX2. The controller 52 selects the second shifting condition when an assessment has been made that the acceleration DA is the same as the first prescribed value DX1 or is greater than the prescribed value DX1, that is, that the bicycle 10 is substantially accelerating. The controller 52 selects the third shifting condition when an assessment has been made that the acceleration DA is the same as the second prescribed value DX2 or is less than the prescribed value DX2, that is, that the bicycle 10 is substantially decelerating.

Next, the controller 52 acquires the manual force FA from the manual force detection unit 54 in step S14. Then, the controller 52 assesses whether or not the shifting condition has been satisfied based on the selected shifting condition and the manual force FA in step S15. Next, the controller 52 generates a shift control signal based on the results of the comparison between the manual force FA and the assessment value FX and outputs the generated shift control signal to the actuator 46 in step S16. The shift control signal includes an upshift signal S1 (a first shift control signal) for upshifting the shift position and a shift control signal S2 (a second shift control signal) for downshifting the shift position of the transmission device 22. Here, "upshifting the shift position of the transmission device 22" means to control the transmission device 22 so that the gear ratio of the transmission device 22 increases; "downshifting the shift position of the transmission device 22" means to control the transmission device 22 so that the gear ratio of the transmission device 22 decreases.

Specifically, the controller 52 generates an upshift signal S1 when the first shifting condition has been selected and when an assessment has been made that the manual force FA is the same as the first assessment value FXA1 or is less than the first assessment value FXA1.

The controller 52 generates a downshift signal S2 when the first shifting condition has been selected and when an assessment has been made that the manual force FA is the same as the second assessment value FXA2 or is greater than the second assessment value FXA2. The controller 52 generates an upshift signal S1 when the second shifting condition has been selected and when an assessment has been made that the manual force FA is the same as the first assessment value FXB or is less than the first assessment value FXB. The controller 52 generates a downshift signal S2 when the third shifting condition has been selected and when an assessment has been made that the manual force FA is the same as the second assessment value FXC or is greater than the second assessment value FXC.

Next, the controller 52 assesses whether or not a shift command signal from the manual shift command input unit 28 has been detected in step S17. When an assessment has been made that a shift command signal has not been detected, the controller 52 ends the present operation. On the other hand, when an assessment has been made that a shift command signal has been detected, the controller 52 changes the assessment value FX to a value that is different from that prior to receiving the shift command signal, generates an upshift signal S1 or a downshift signal S2, and ends the present operation in step S18. The upshift signal S1 or the downshift signal S2 generated by the controller 52 are output from the controller 52 to the actuator 46.

Specifically, the controller 52 generates an upshift signal S1 when a first shift command signal has been detected. The controller 52 increases the first assessment value FXA1 when the first shift command signal has been detected and when the first shifting condition has been selected. The controller 52 increases the first assessment value FXB when the first shift command signal has been detected and when the second shifting condition has been selected.

The controller 52 generates a downshift signal S2 when a second shift command signal has been detected. The controller 52 decreases the second assessment value FXA2 when the second shift command signal has been detected and when the first shifting condition has been selected. The second assessment value FXC decreases when the second shift command signal has been detected and when the third shifting condition has been selected.

When each of the assessment values FX has been changed, the controller 52 stores the changed assessment values FX in the storage unit 60, corresponding with each of the shifting conditions. When the changed assessment values FX are being stored and a shifting condition has been selected, the storage unit 60 outputs the changed assessment values FX to the controller 52. When an assessment has been made that the bicycle 10 has been stopped for a prescribed period of time, the controller 52 deletes the changed assessment values FX from the storage unit 60.

When an assessment has been made that the crank 30 has stopped in step S11, the controller 52 proceeds to step S19 and selects the stopped condition. Next, the controller 52 acquires the speed VA from the manual force detection unit 54 in step S20. Then, the controller 52 assesses whether or not the stopped condition is satisfied based on the stopped condition and the speed VA in step S21. Next, the controller 52 generates an upshift signal S1 or a downshift signal S2 based on the results of the comparison with the speed VA and ends the present operation in step S22. The upshift signal S1 or the downshift signal S2 generated by the controller 52 is output from the controller 52 to the actuator 46.

For example, the controller 52 generates an upshift signal S1 or a downshift signal S2 so that the shift position will upshift as the speed VA increases, as described below. The relationship "VX1<VX2<VX3<VX4<VX5" is satisfied. The first speed VX1 may be set, for example, to 0 km per hour.

The controller 52 generates an upshift signal S1 or a downshift signal S2 to put the shift position of the transmission device 22 in the "fifth gear" when the speed VA is the same as the first speed VX1 or is greater than the first speed VX1 and is less than the second speed VX2.

The controller 52 generates an upshift signal S1 or a downshift signal S2 to put the shift position of the transmission device 22 in the "sixth gear" when the speed VA is the same as the second speed VX2 or is greater than the second speed VX2 and is less than the third speed VX3.

The controller 52 generates an upshift signal S1 or a downshift signal S2 to put the shift position of the transmission device 22 in the "seventh gear" when the speed VA is the same as the third speed VX3 or is greater than the third speed VX3 and is less than the fourth speed VX4.

The controller 52 generates an upshift signal S1 or a downshift signal S2 to put the shift position of the transmission device 22 in the "eighth gear" when the speed VA is the same as the fourth speed VX4 or is greater than the fourth speed VX4 and is less than the fifth speed VX5.

Figure 4:
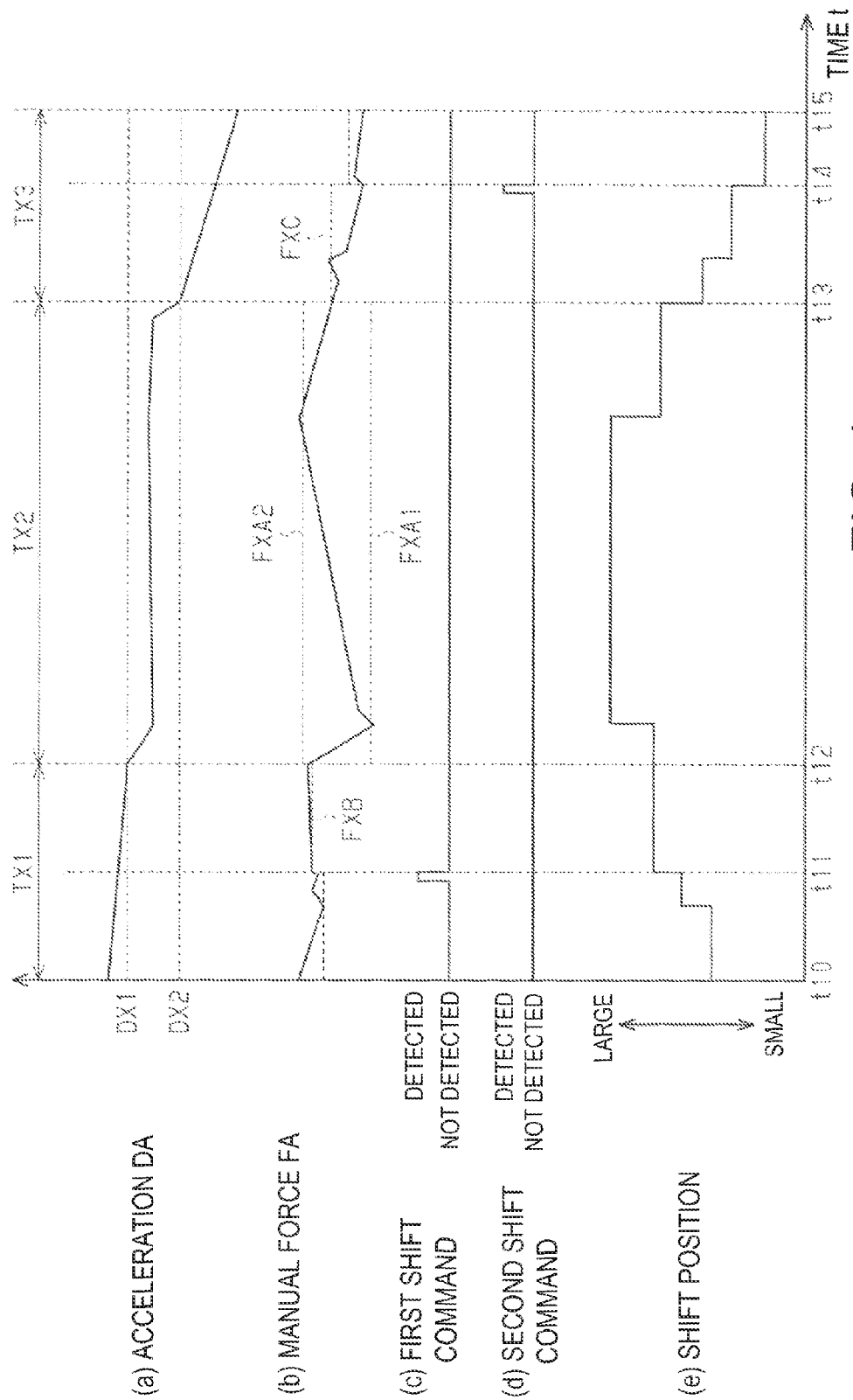
FIG. 4 is a timing chart showing an example of an execution mode of the shifting operation of the illustrated embodiment.

One example of the execution mode of the shifting operation that is executed by the controller 52 will be described with reference to FIG. 4. The manual force FA in part (b) of FIG. 4 indicates the average value of the left and right manual forces FA.

The second shifting condition is selected during a period TX1 between time t10 to time t12 based on the acceleration DA being greater than or equal to the first prescribed value DX1. The controller 52 generates an upshift signal S1 when the manual force FA becomes less than or equal to the first assessment value FXB during the period TX1.

Time t11 indicates the time when the first shift command is detected during the period TX1. At this time, the controller 52 generates the upshift signal S1 by receiving the first shift command. Accordingly, the transmission device 22 upshifts the shift position (increases the gear ratio). Additionally, the controller 52 changes the first assessment value FXB to a value that is greater than that prior to receiving the first shift command.

The first shifting condition is selected during a period TX2 between time t12 to time t13 based on the acceleration DA being less than the first prescribed value DX1 and greater than or equal to the second prescribed value DX2. The controller 52 generates an upshift signal S1 when the manual force FA becomes the same as the first assessment value FXA1 or is less than the first assessment value FXA1 during the period TX2. Accordingly, the transmission device 22 upshifts the shift position. The controller 52 generates a downshift signal S2 when the manual force FA becomes the same as the second assessment value FXA2 or greater than the second assessment value FXA2 during the period TX2. Accordingly, the transmission device 22 downshifts the shift position (decreases the gear ratio).

The third shifting condition is selected during a period TX3 between time t13 to time t15 based on the acceleration DA being less than the second prescribed value DX2. The controller 52 generates a downshift signal S2 when the manual force FA becomes the same as the second assessment value FXC or greater than the second assessment value FXC during the period TX3. Accordingly, the transmission device 22 downshifts the shift position.

Time t14 indicates the time when the second shift command is detected during the third period. At this time, the controller 52 generates the downshift signal S2 by receiving the second shift command. Accordingly, the transmission device 22 downshifts the shift position. Additionally, the controller 52 changes the second assessment value FXC to a value that is less than that prior to receiving the second shift command.

The process executed by the control unit 50 will now be described. The controller 52 selects the first shifting condition when an assessment has been made that the bicycle 10 is traveling at a substantially stable speed VA based on the acceleration DA. The controller 52 generates a downshift signal S2 when the manual force FA becomes the same as the first assessment value FXA1 or greater than the first assessment value FXA1. The controller 52 generates an upshift signal S1 when the manual force FA becomes the same as the second assessment value FXA2 or less than the second assessment value FXA2. Accordingly, when the first shifting condition has been selected, the transmission device 22 is controlled so that the manual force FA will be between the first assessment value FXA1 and the second assessment value FXA2.

The controller 52 selects the second shifting condition when an assessment has been made that the bicycle 10 is substantially accelerating based on the acceleration DA. The controller 52 upshifts the shift position when the manual force FA becomes the same as the first assessment value FXB or less than the first assessment value FXB. Accordingly, when the second shifting condition has been selected, the transmission device 22 is controlled so that the manual force FA will not become less than the first assessment value FXB.

The controller 52 selects the third shifting condition when an assessment has been made that the bicycle 10 is substantially decelerating based on the acceleration DA. The controller 52 downshifts the shift position when the manual force FA becomes the same as the second assessment value FXC or greater than the second assessment value FXC. Accordingly, when the third shifting condition has been selected, the transmission device 22 is controlled so that the manual force FA will not become greater than the second assessment value FXC.

The control unit 50 exerts the following effects.

(1) The controller 52 selects one of the first to the third shifting conditions based on the acceleration DA and controls the transmission device 22 based on the selected shifting condition. Each of the first to the third shifting conditions includes a different assessment value FX. Consequently, the transmission device 22 can be more finely controlled, as compared to a configuration in which the transmission device 22 is constantly controlled using the same value. Accordingly, realizing finer control of the transmission device 22 according to the riding environment of the bicycle 10 is possible.

(2) The controller 52 controls the transmission device 22 so that the manual force FA will be between the first assessment value FXA1 and the second assessment value FXA2 when an assessment has been made that the bicycle 10 is traveling at a substantially stable speed VA based on the acceleration DA. Accordingly, the gear ratio can be changed so that the manual force FA will converge to an appropriate value. Consequently, the rider is able to constantly pedal the bicycle 10 at a manual force FA that is within a prescribed range.

(3) The controller 52 controls the transmission device 22 so that the manual force FA will not become less than the first assessment value FXB when an assessment has been made that the bicycle 10 is substantially accelerating based on the acceleration DA. Consequently, the rider is able to appropriately apply manual force to the pedal 34 when accelerating the bicycle 10.

(4) The controller 52 controls the transmission device 22 so that the manual force FA will not become greater than the second assessment value FXC when an assessment has been made that the bicycle 10 is substantially decelerating based on the acceleration DA. Consequently, when decelerating the bicycle 10, suppressing the load on the rider to pedal the pedal 34 from becoming excessively great when, for example, climbing a slope is possible.

(5) The controller 52 controls the transmission device 22 to upshift based on a first shift command and controls the transmission device 22 to downshift based on a second shift command, which are received from the manual shift command input unit 28. Accordingly, controlling the transmission device 22 that reflects the intention of the rider is possible.

(6) When the first shift command is received, the controller 52 changes the first assessment values FXA1 and FXB to values that are greater than those prior to receiving the first shift command. Consequently, upshifting the transmission device 22 due to a decrease in the manual force FA is facilitated. Accordingly, controlling the transmission device 22 in order to better reflect the intention of the rider is possible.

(7) When the second shift command is received, the controller 52 changes the second assessment values FXA2 and FXC to values that are less than those prior to receiving the second shift command. Consequently, downshifting the transmission device 22 due to an increase in the manual force FA is facilitated. Accordingly, controlling the transmission device 22 in order to better reflect the intention of the rider is possible.

(8) The controller 52 controls the transmission device 22 based on the speed VA when the manual force detection unit 54 has not substantially detected the manual force FA for a prescribed period of time. Consequently, controlling the gear ratio to be suitable for the speed VA even when the rider is not pedaling the bicycle 10 is possible.

(9) There are cases in which the rider will put weight on one pedal 34 or the like, and the manual force FA on the other pedal 34 is not detected. The controller 52 assesses that the crank 30 has stopped when at least either the left or right manual force detection unit 54 has not substantially detected the manual force FA for a prescribed period of time. Consequently, suppressing an errant assessment that the crank 30 has stopped is possible.

Now some modified examples of the above-described embodiment will be described.

Alternatively, the transmission device 22 can be controlled the based on a traveling state of the bicycle 10 instead of from the manual force FA. Examples of a traveling state of the bicycle 10 include the number of revolutions of the crank 30 and the speed VA. When controlling the transmission device 22 based on the number of revolutions of the crank 30, the first to the third shifting conditions include assessment values that correspond to the number of revolutions of the crank 30. When controlling the transmission device 22 based on the speed VA, the first to the third shifting conditions include assessment values that correspond to the speed VA. The transmission device 22 can also be more finely controlled, as compared to a configuration in which the transmission device 22 is constantly controlled using the same value, in this modified example. Accordingly, realizing finer control of the gear ratio according to the riding environment of the bicycle 10 is possible.

Alternatively, a second assessment value FXD in the second shifting condition can be included. In this case, the controller 52 generates a downshift signal S2 when the second shifting condition has been selected and when the manual force FA is the same as the second assessment value FXD or is less than the second assessment value FXD.

Alternatively, a first assessment value FXE in the third shifting condition can be included. In this case, the controller 52 generates an upshift signal S1 when the third shifting condition has been selected and when the manual force FA is the same as the first assessment value FXE or is greater than the first assessment value FXE.

Alternatively, the first assessment value FXA1 or the second assessment value FXA2 can be omitted from the first shifting condition. When omitting the first assessment value FXA1, if the first shifting condition has been satisfied, only the downshift signal S2 is generated in step S16 of the shifting operation. When omitting the second assessment value FXA2, if the first shifting condition has been satisfied, only the upshift signal S1 is generated in step S16 of the shifting operation.

Alternatively, the default value of the first assessment value FXA1 and the default value of the first assessment value FXB can be set the same. Also alternatively, the default value of the second assessment value FXA2 and the default value of the second assessment value FXC can be set the same.

When the shift command signal has been detected, the controller 52 changes only the assessment value FX of the shifting condition that is selected at that time, but the assessment values FX of all the shifting conditions can also be changed. For example, when a first gear changing signal has been detected, the controller 52 increases the first assessment values FXA1 and FXB regardless of which shifting condition has been selected. When a second gear changing signal has been detected, the controller 52 decreases the second assessment values FXA2 and FXC regardless of which shifting condition has been selected.

The controller 52 can decrease the first assessment values FXA1 and FXB when a first gear changing signal has been detected. The controller 52 can increase the second assessment values FXA2 and FXC when a second gear changing signal has been detected. The control unit 50 can comprise an operating unit with which the rider is able to delete each assessment value FX after the change. The control unit 50 can comprise an input unit with which the rider is able to set the default value of each assessment value FX.

One of the first to the third shifting conditions can be omitted. The stopped shifting condition can also be omitted. In this case, the configuration can be such that the first to the third shifting conditions are selected based on the acceleration DA even when the crank 30 has stopped.

A torque sensor can be disposed between the crank 30 and the crankshaft 32 in lieu of the strain sensor. Thus, the manual force FA can be detected based on the output of the torque sensor. In short, any sensor can be used as long as the sensor outputs a signal according to the manual force that is applied to the pedal 34.

A revolution number sensor can be used to output a signal corresponding to the number of revolutions of the front wheel 16 or the rear wheel 18. Thus, the speed VA and the acceleration DA can be detected based on the output of the revolution number sensor. In short, any sensor can be used as long as the sensor outputs a signal corresponding to the speed of the bicycle 10.

The acceleration detection unit 58 can be changed to detect the acceleration DA by differentiating the speed VA.

An acceleration sensor can be mounting for outputting a signal corresponding to the acceleration to the bicycle 10. In this case, the acceleration detection unit 58 can be configured to detect the acceleration DA based on the output of the acceleration sensor is possible.

The transmission device 22 can be changed to a continuously variable transmission device that can continuously change the gear ratio. The transmission device 22 can be changed to an external-type transmission device as well. In short, any transmission device can be used as long as the transmission device is able to change the gear ratio of the bicycle 10.

Alternatively, the control unit 50 can be integrated with the transmission device 22. Also the control unit 50 can be connected to one of the dynamo 24, the two strain sensors 26, the manual shift command input unit 28, or the actuator 46 by wireless communication.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electric bicycle component comprising:
   a controller programmed to control a transmission device of a bicycle; and
   an acceleration detection unit programmed to detect a moving average value of a change in speed over a period of time at a plurality of points as an acceleration of the bicycle;
   the controller being programmed to select one of a plurality of shifting conditions based on at least the acceleration that has been detected by the acceleration detection unit, the controller being programmed to output a command to control the transmission device based on the shifting condition that has been selected.

2. The electric bicycle component according to claim 1, further comprising:
   a manual force detection unit programmed to detect a manual force that is applied to a pedal of the bicycle,
   the controller being programmed to control the transmission device based on the shifting condition that has been selected and the manual force that has been detected by the manual force detection unit.

3. The electric bicycle component according to claim 1, wherein
   the controller is programmed to change the shifting condition that has been selected to a different shifting condition based on the acceleration that has been detected by the acceleration detection unit.

4. The electric bicycle component according to claim 1, wherein
   the controller is programmed to select a first shifting condition of the shifting conditions upon making an assessment that the bicycle is traveling at a substantially stable speed based on the acceleration that has been detected by the acceleration detection unit.

5. The electric bicycle component according to claim 1, wherein
   the controller is programmed to select a second shifting condition of the shifting conditions upon making an assessment that the bicycle is substantially accelerating based on the acceleration that has been detected by the acceleration detection unit.

6. The electric bicycle component according to claim 1, wherein
   the controller is programmed to select a third shifting condition of the shifting conditions upon making an assessment that the bicycle is substantially decelerating based on the acceleration that has been detected by the acceleration detection unit.

7. The electric bicycle component according to claim 2, wherein
   each of the shifting conditions comprises at least one assessment value; and
   the controller is programmed to control the transmission device based on the manual force that has been detected by the manual force detection unit and the at least one assessment value for the shifting condition that has been selected.

8. The electric bicycle component according to claim 7, wherein
   the controller is programmed to control the transmission device to upshift when the manual force that has been detected by the manual force detection unit is the same as a first assessment value of the at least one assessment value for the shifting condition that has been selected, or is less than the first assessment value.

9. The electric bicycle component according to claim 7, wherein
   the controller is programmed to control the transmission device to downshift when the manual force that has been detected by the manual force detection unit is the same as a second assessment value of the at least one assessment value for the shifting condition that has been selected, or is greater than the second assessment value.

10. The electric bicycle component according to claim 7, wherein
    the at least one assessment value for each of the shifting conditions comprises at least first and second assessment values, the first assessment value being less than the second assessment value.

11. The electric bicycle component according to claim 7, wherein
    the controller is configured to receive a shift command from a manual shift command input unit; and
    the controller is programmed to control the transmission device to upshift or to downshift, based on the shift command received from the manual shift command input unit, and to change the at least one of the assessment value for the shifting condition that has been selected to a value different from that prior to receiving the shift command.

12. The electric bicycle component according to claim 11, wherein
the controller is programmed to control the transmission device to upshift when the manual force that has been detected by the manual force detection unit is the same as a first assessment value of the at least one of the assessment value for the shifting condition that has been selected, or is less than the first assessment value,
the controller is programmed to control the transmission device to upshift when a first shift command to upshift the transmission device has been received, and
the controller is programmed to change the first assessment value to a value that is greater than that prior to receiving the first shift command.

13. The electric bicycle component according to claim 11, wherein
the at least one assessment value for each of the shifting conditions comprises at least a second assessment value;
the controller is programmed to control the transmission device to downshift when the manual force that has been detected by the manual force detection unit is the same as a second assessment value of the at least one of the assessment value for the shifting condition that has been selected, or is greater than the second assessment value;
the controller is programmed to control the transmission device to downshift when a second shift command to downshift the transmission device has been received; and
the controller is programmed to change the second assessment value to a value that is less than that prior to receiving the second shift command.

14. The electric bicycle component according to claim 11, wherein
the at least one of the assessment value for each of the shifting conditions comprises at least first and second assessment values, the first assessment value having a default value that is less than a default value of the second assessment value for each of the shifting conditions.

15. The electric bicycle component according to claim 2, further comprising:
a speed detection unit programmed to detect a speed of the bicycle;
the controller being programmed to control the transmission device based on the speed of the bicycle when the manual force detection unit has not detected the manual force for a prescribed period of time.

16. The electric bicycle component according to claim 15, wherein
the speed detection unit detects the speed of the bicycle based on a signal that is output from a dynamo of the bicycle.

17. The electric bicycle component according to claim 1, wherein
the acceleration detection unit detects the acceleration of the bicycle based on a signal that is output from a dynamo of the bicycle.

18. The electric bicycle component according to claim 17, wherein
the acceleration detection unit detects an average value of the acceleration of the bicycle over a prescribed period of time, based on the signal that is output from the dynamo of the bicycle.

19. The electric bicycle component according to claim 2, wherein
the manual force detection unit detects the manual force that is applied to the pedal of the bicycle based on a signal that is output from a strain sensor that outputs a signal that changes according to strain of a crank of the bicycle.

20. The electric bicycle component according to claim 1, further comprising:
a storage unit having the shifting conditions stored therein.

21. An electric bicycle component comprising:
a controller programmed to control a transmission device of a bicycle; and
a manual force detection unit programmed to detect a manual force that is applied to a pedal of the bicycle;
the controller being configured to receive a shift command from a manual shift command input unit, the controller being programmed to control the transmission device based on the manual force that has been detected by the manual force detection unit and at least one assessment value for controlling the transmission device based on the manual force, the controller being programmed to output a command to upshift or downshift the transmission device in response to receiving the shift command from the manual shift command input unit; and the controller being programmed to change the at least one of the assessment value to a value that is different from that prior to receiving the shift command.

22. The electric bicycle component according to claim 21, wherein
the controller is programmed to control the transmission device to upshift when receiving a first shift command from the manual shift command input unit for upshifting the transmission device, and
the controller is programmed to change a first assessment value of the at least one of assessment value to a value that is greater than that prior to receiving the first shift command.

23. The electric bicycle component according to claim 21, wherein
the controller is programmed to control the transmission device to downshift when receiving a second shift command from the manual shift command input unit for downshifting the transmission device, and
the controller is programmed to change a second assessment value of the at least one of assessment value to a value that is less than that prior to receiving the second shift command.

24. The electric bicycle component according to claim 21, wherein
the at least one of the assessment value comprises at least first and second assessment values, the first assessment value having a default value that is less than a default value of the second assessment value for each of the shifting conditions.

* * * * *